United States Patent
Strausbaugh et al.

(10) Patent No.: US 6,788,869 B2
(45) Date of Patent: Sep. 7, 2004

(54) METHOD FOR PACKAGING PASSIVE OPTOELECTRIC ASSEMBLIES IN A LIMITED SPACE

(76) Inventors: William Strausbaugh, 485 Saginaw Rd., Mt. Wolf, PA (US) 17347; Eric Boyer, 717 Claster Blvd., Dauphin, PA (US) 17018; Richard Buterbaugh, 1811 S. Geyers Church Rd., Middletown, PA (US) 17057

( * ) Notice: Subject to any disclaimer, the term of this patent is extended or adjusted under 35 U.S.C. 154(b) by 88 days.

(21) Appl. No.: 10/060,946

(22) Filed: Jan. 30, 2002

(65) Prior Publication Data

US 2002/0159747 A1 Oct. 31, 2002

(Under 37 CFR 1.47)

Related U.S. Application Data

(60) Provisional application No. 60/264,949, filed on Jan. 30, 2001.

(51) Int. Cl.[7] ................................................. G02B 6/00
(52) U.S. Cl. ........................................................ 385/135
(58) Field of Search ................................. 385/134, 137

(56) References Cited

U.S. PATENT DOCUMENTS

| 4,765,709 A | * | 8/1988 | Suillerot et al. | ........... 350/96.2 |
|---|---|---|---|---|
| 4,770,357 A | * | 9/1988 | Sander et al. | ............. 242/54 R |
| 5,052,775 A | * | 10/1991 | Bossard et al. | ................ 385/76 |
| 5,067,784 A | * | 11/1991 | Debortoli et al. | .............. 385/53 |
| 5,457,764 A | * | 10/1995 | Edera | ......................... 385/135 |

* cited by examiner

Primary Examiner—Khiem Nguyen

(57) ABSTRACT

A module comprising: (a) a housing; (b) a tray mounted in the housing, wherein the tray comprises at least: (i) a first and second submodule, each submodule having one or more compartments for containing individual add/drop filters; (ii) a first plurality of cascaded add/drop filters installed in the first submodule; and (iii) a second plurality of cascaded add/drops filters installed in the second submodule; and (c) connectors mounted to the housing and optically connected to the fibers at the ends of the first and second plurality of cascaded add/drop filters.

20 Claims, 4 Drawing Sheets

METHOD FOR PACKAGING PASSIVE OPTOELECTRIC ASSEMBLIES IN A LIMITED SPACE

REFERENCE TO RELATED APPLICATION

The priority claim of this application is based on Provisional Application No. 60/264,949, filed on Jan. 30, 2001, which is hereby incorporated by reference.

FIELD OF INVENTION

The present invention relates generally to a multiplexes/demultiplexer and, more specifically, to a modular multiplexes/demultiplexer for use with backplane systems.

BACKGROUND OF INVENTION

Multiplexing and demultiplexing are well known concepts in tele- and data-communications. In optics, one form of multiplexing involves combining various channels of varying wavelengths on a single fiber. This way, the number of fibers needed for linking distant locations is miinimized. Conversely, one form of demultiplexing involves splitting channels propagating on a single fiber onto discrete fibers. Demultiplexing is generally required, for example, to switch, route or otherwise manipulate individual channels.

To effect multiplexing/demultiplexing, often "cascaded" add/drop filters are used, a simplistic arrangement of which is shown in FIG. 5. The add/drop filter 51 is a well-known optical component which, in one direction, couples or "adds" channels propagating on two or more input fibers 52a, 52b onto a fewer number of output fibers 53, and, in the other direct, splits or "drops" channels propagating on a fiber 53 onto two or more fibers 52a, 52b. The add/drop filters are typically tuned to add/drop different wavelengths according to ITU grid. The ITU grid is well known and thus is not specifically addressed herein. It should be understood that add/drops filters for multiplexing and demultiplexing are generally the same; it is only the direction in which the light is propagating that determines whether the add/drop filter serves to add or drop channels. Therefore, for simplicity, the discussion herein will focus on multiplexing, but the concepts discussed apply equally as well to demultiplexing.

To achieve a high degree of multiplexing, that is, one in which many channels are combined on a single fiber, it is necessary to cascade the add/drop filters together. In this arrangement, the output fiber 53 of the add/drop filter 51 (i.e., the single fiber carrying the channels of the input fibers 52a, 52b) is used as one of the input fibers 55a of another add/drop filter 56. Thus, the channels carried on the output fiber 53 of the add/drop filter 51 are combined with the channels of the other input fibers) 55b of the other add/drop filter 56. This "cascading" configuration may be repeated with other add/drop filters downstream and, in this way, combine many channels onto a single fiber 57. For example, as shown in FIG. 5, 8 channel multiplexing can be achieved as follows: 4 add/drop filters are used first to combine 8 channels onto 4 different fibers; then 2 add/drop filters are used to combine the channels onto 2 fibers; and finally, a single add/drop is used to combine the channels onto the single fiber 57. The cascading arrangement in FIG. 5 is particularly simplistic and was used for illustrative purposes. Most configurations used in industry tend to be more complex to minimize reflective losses or otherwise optimize the performance of the add/drop filers. The number of channels that may be carried on a single fiber is limited by many factors which will not be addressed specifically herein.

From the above description and FIG. 5, it becomes apparent that the arrangement of cascaded add/drop filters and the ganglia of interlinking fibers needed to effect a high degree of multiplexing can become complex and physically difficult to manage, especially when there is a need to maintain a minimum bend radius on all the fibers. This difficulty is complicated by recent trends in the industry that require more compactness and modularity. Specifically, there is a premium on space in many of because the optical devices in which optical multiplexers/demultiplexers are used, such as in routers and switches, since these devices are need. Furthermore, as in most industrial products, there is a desire to modularize the components to facilitate scaling up as multiplexing needs require, e.g., from 8 channels to 16, and from 16 to 32 and so on. Furthermore, modularization reduces the number of different parts that must be stocked or otherwise accounted from when designing the optical devices.

At the heart of modularization is packaging. A modular add/drop needs to be contained preferably in a single housing and this housing needs to be compact and robust. These requirements coupled with complexity inherent in cascading add/drop filters, especially with the minimum fiber bend radius requirements of the individual fibers, pose a significant challenge. The present invention meets this challenge.

SUMMARY OF INVENTION

The present invention overcomes the problems presented in modularizing an add/drop by arranging the add/drop filters in submodules. This way, the surface area available to assemble all the add/drops filters and manage their fibers is effectively increased. Additionally, by using a tray having submodules, one submodule can be designated as the add submodule and the other submodule can be designated as the drop submodule. This adds a certain amount of modularization within the module itself. In a preferred embodiment, the submodules are hermaphroditic allowing two identical submodules to mate with each other or to an intermediate module and thereby further exploit modularity.

The submodules have compartments for accommodating the add/drop filters themselves. To minimize the height of the tray, the each submodule preferably uses at least two compartments thereby spreading the add/drop components horizontally. The compartments preferably are asymmetrically located such that, when the two submodules are combined, the compartments are offset from one another and do not interfere with each other. Again, this allows for a lower profile tray.

Accordingly, one aspect of the invention is a tray subassembly for use in an add/drop module. In a preferred embodiment, the tray comprises: (a) a first and second submodule, each submodule having one or more compartments for containing individual add/drop filters; (b) a first plurality of cascaded add/drop filters installed in the first submodule; and (c) a second plurality of cascaded add/drops filters installed in the second submodule.

Another aspect of the invention is an add/drop module comprising the tray. In a preferred embodiment, the module comprises: (a) a housing; (b) a tray mounted in the housing, wherein the tray comprises at least: (i) a first and second submodule, each submodule having one or more compartments for containing individual add/drop filters; (ii) a first plurality of cascaded add/drop filters installed in the first submodule; and (iii) a second plurality of cascaded add/drops filters installed in the second submodule; and (c) connectors mounted to the housing and optically connected to the fibers at the ends of the first and second plurality of cascaded add/drop filters.

DETAILED DESCRIPTION OF PREFERRED EMBODIMENTS

Figure 1:
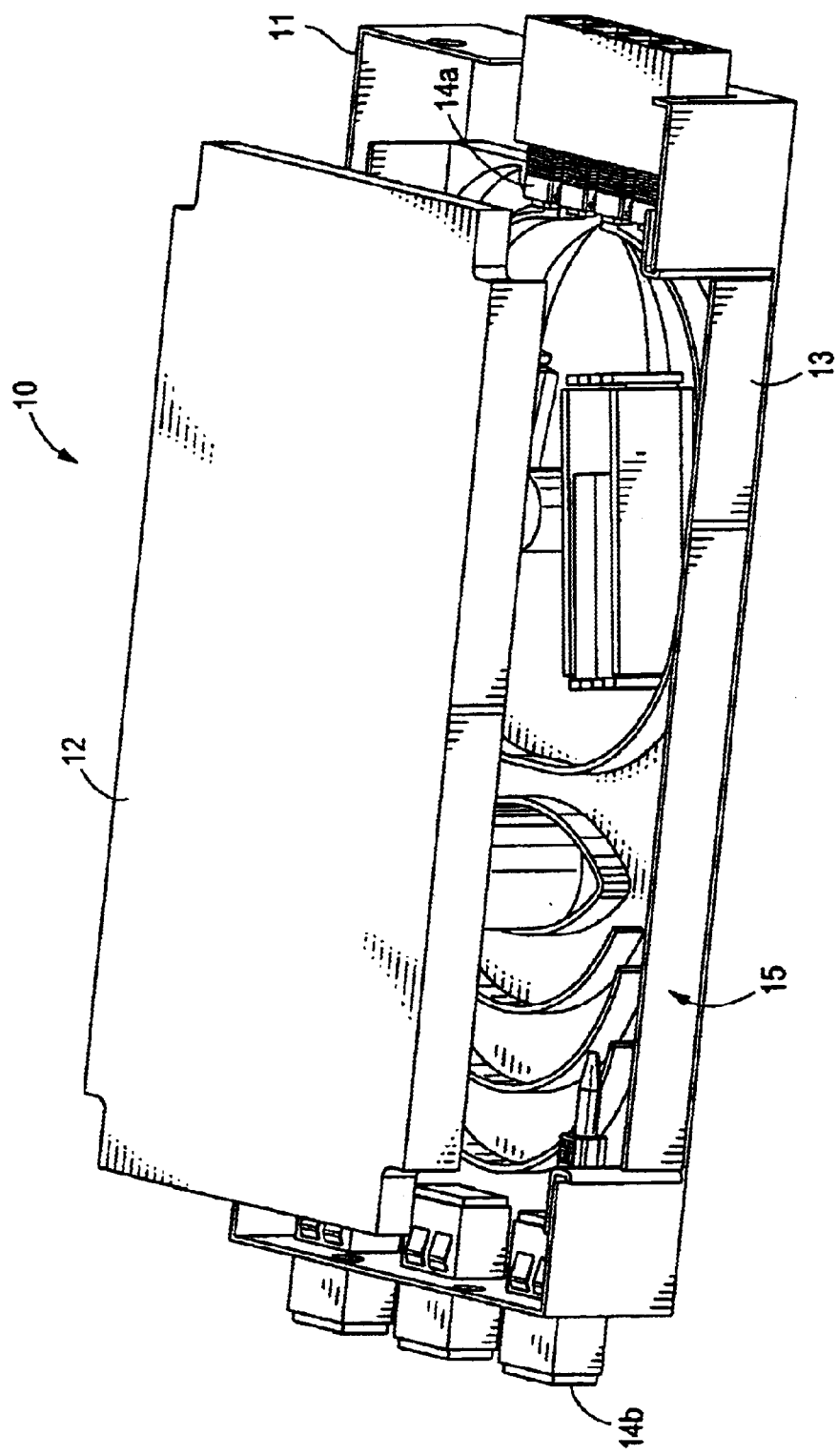
FIG. 1 shows a partially exploded perspective view of the module of the present invention.

Referring to FIG. 1, a preferred embodiment of the add/drop module of the present invention is shown. The modularity of the device is readily apparent from the figure and achieves a high degree of multiplexing/demultiplexing in a very small area. The applications for such a modular add/drop are numerous, although it is particularly well suited for interfacing with backplanes. Backplanes are well known in the art and are used, for example, to effect signals switching and manipulation.

The particular add/drop module 10 shown in FIG. 1 multiplexes/demultiplexes 8 channels and accommodates supervisory channels. It should be understood, however, that other module configurations are possible, including, for example, 4-channel and 2-channel multiplexing/demultiplexing. Additionally, it should be understood that the add/drop modules themselves may be cascaded to multiplex/demultiplex 16, 32, 64 and even more channels.

As shown, the add/drop module 10 has a rectilinear housing 11 which contains a tray subassembly 15 having two submodules 12,13 for holding the add/drop filters and managing their fibers. The housing 10 also has connectors 13, 14 for interconnection with other fibers.

Figure 2:
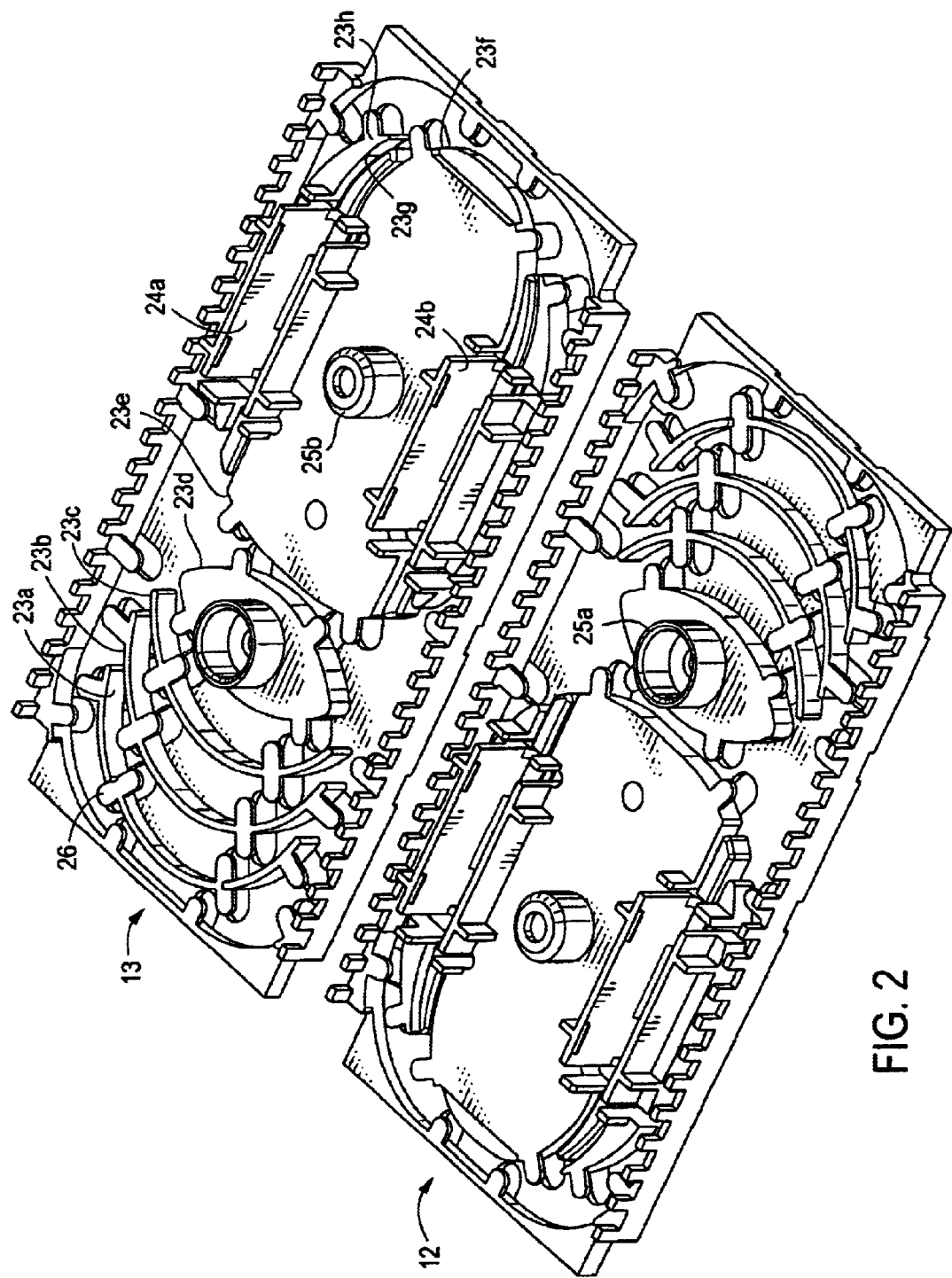
FIG. 2 shows a perspective view of the tray which is slightly modified from the tray as depicted in FIG. 1.
Figure 3:
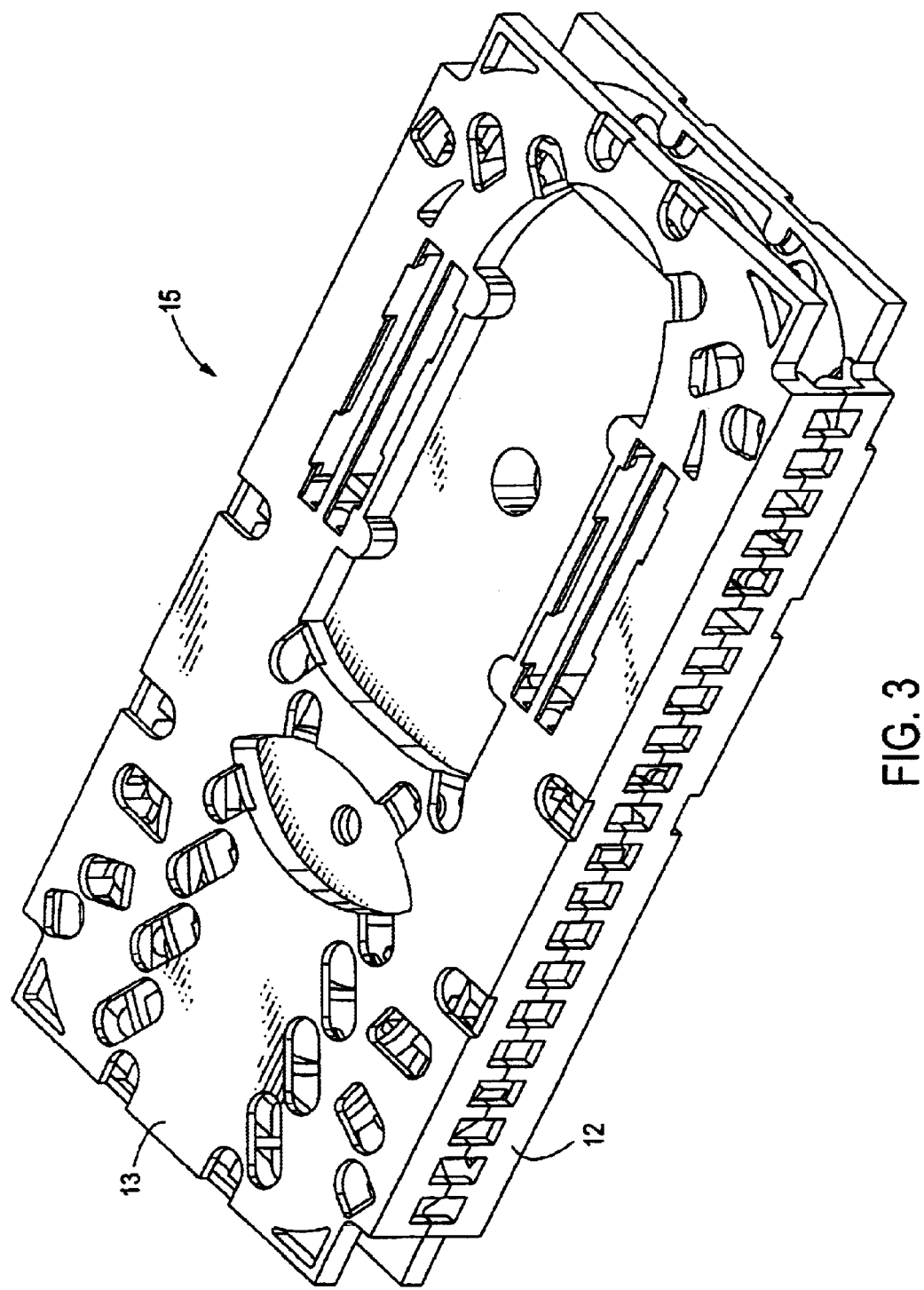
FIG. 3 shows a perspective view of both submodules of the tray of FIG. 2 which are laid open to expose the inside surface of each.

The inner side of each submodule is shown in FIG. 2. Each submodule has one or more compartments 24a, 24b for containing individual add/drop filters and has contours to define bend guides 23a–g to maintain a minimum bend radius for the fibers of the add/drop filters. A first plurality of cascaded add/drop filters (not shown) are installed in the first submodule 12, while a second plurality of cascaded add/drops filters (also not shown) are installed in the second submodule 13. The add/drop filters and their associated fiber are not shown to simplify the figures and reveal the more salient features of the tray submodules. The actual installation of the add/drop filters and the arrangement of the fibers in the bend guides is readily ascertainable to one of ordinary skill in the art. It is worthwhile to mention that although the fiber management is performed exclusively in both the first and second submodules 12,13, it is well within the scope of the invention that the fiber management be performed in yet another "intermediate" module disposed between the first and second submodule. Such an embodiment may be preferred if the fiber management tends complicated and not practically performed in the space provided by the first and second submodules alone.

By installing filters on both submodules, the surface area available to arrange all the add/drop filters and their fibers effectively doubles, and, if intermediate fiber management submodules are used, the available increases in kind. Additionally, by splitting the available surface area into submodules, one submodule can be designated as a multiplexer while the other side can be designated as the demultiplexer. This adds a certain amount of modularity within the module itself.

From FIG. 2 it should be readily apparent that the submodules 12, 13 are substantially similar. This is preferred not only from the standpoint of simplifying the design and minimizing the parts inventory, but also from the standpoint of manufacturing simplicity-the submodules are configured the same regardless of whether they are used for multiplexing or demultiplexing. The substantially similar submodules are similar with particular respect to their inner surface. Minor differences in the outer surface, for example, slight machining differences, are anticipated.

In a particularly preferred configuration, the submodules are hermaphroditic, thereby enabling identical submodules to mate. Specifically, each submodule comprises interengaging male and female connectors 25b, 25a. Again, this is preferable from the standpoint of minimizing the inventory of parts needed. In a hermaphrodic configuration, it is preferable to asymmetrically locate the compartments 24a, 24b with respect to a first axis on each submodule. The first axis in the embodiment of FIG. 2 happens to be traverse to the submodule, although the first axis may be longitudinal as well. By asymmetrically locating the compartments on the tray submodules, when the submodules are mated, the compartments of opposite submodules are offset from one another and thus do not interfer with one another.

Figure 4:
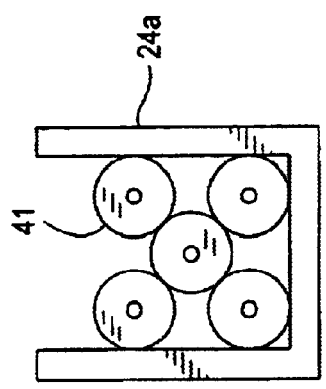
FIG. 4 shows a schematic view of a cross section of the compartment of the tray of FIG. 2.

To minimize the height of each submodule, it is preferred that the add/drop filters are split between at least two compartments 24a and 24b on each submodule. By splitting the add/drops between two compartments, the stacked height of the add/drop filters can effectively be reduced by submodule. It is also anticipated that, as the number of add/drop filters is increased in the module (e.g., to accommodate 16 or 32 channel multiplexing/demultiplexing), the number of compartments per submodule will increase. In addition to using multiple compartments, it is also preferable to arrange the add/drop filters in the compartments so as to minimize their effective height. FIG. 4 shows one possible stacking configuration involving five add/drop filters 41 in compartment 24a.

The bend guides 23a–23g are carefully configured to maintain a minimum bend radius for all of the fibers. Specifically, bend guide 23d defines a minimum bend radius in one direction from which bend guides 23c, 23b, and 23a radiate outward and have a slightly greater bend radius. Bend guide 23f defines the minimum bend radius in the other direction from which bend guides 23g and 23h radiate outward and have a slightly greater bend radius. An arrangement of tabs 26 on the bend guides serve to hold the fibers in place.

Each bend guide is configured to handle the fibers from add/drop filters contained in either compartment. To this end, the compartments 24a and 24b are symmetrically located with respect to a second axis different from the first. As shown in FIG. 2, the compartments 24a and 24b are symmetrical with respect to the longitudinal axis. Since the compartments are symmetrically located and the relationship of each is substantially the same with respect to the bend guides, the bend guides can handle the fibers emanating from add/drop filters in either compartment equally as well.

The particular add/drop filters used on the module 10 and the various combinations to effect multiplexing or demultiplexing are well known in the art. Suitable add/drop filters are commercially available, from, for example, Lucent Technologies (Murray Hill, N.J.), POCI, E-Tech, and Barr.

Figure 5:
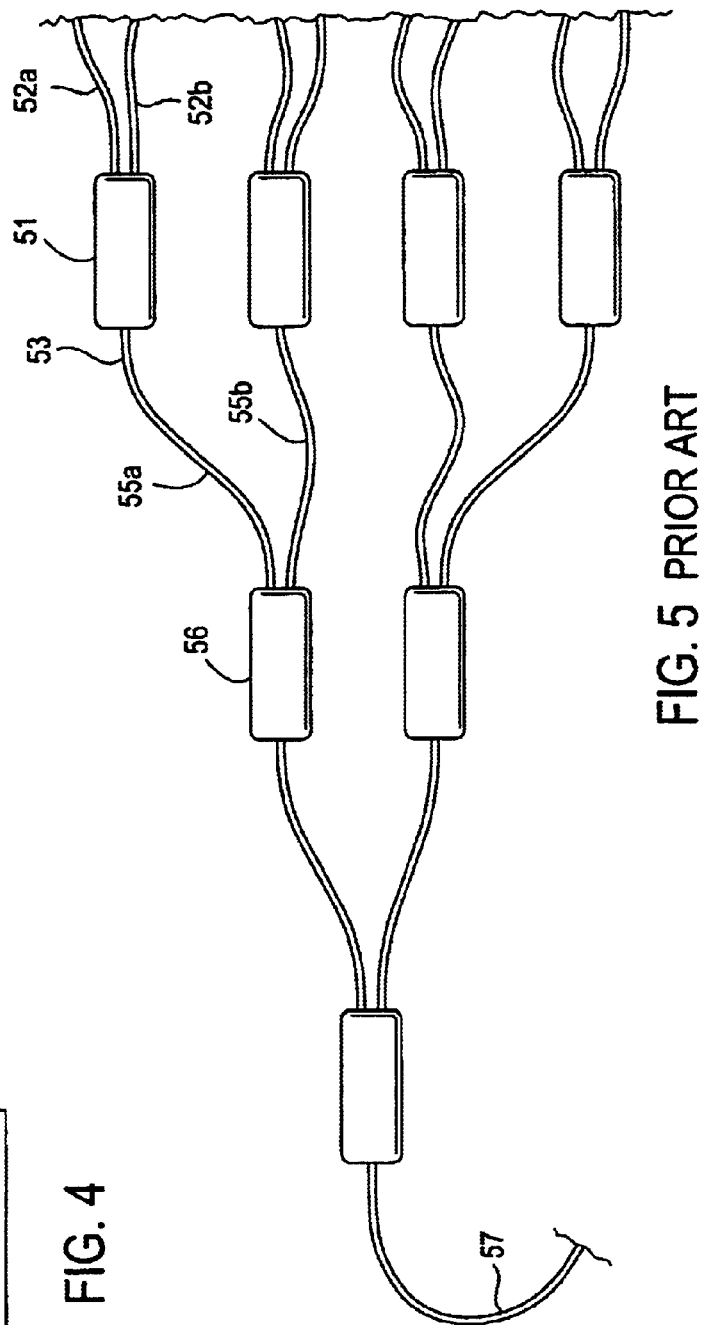
FIG. 5 shows a schematic view of a prior art arrangement of add/drop filters to effect multiplexing/demultiplexing.

As mentioned above, a multiplexer and demultiplexer have the same arrangement of add/drop filters it is simply the direction of the light propagation through the arrangement that determines whether the add/drops are combining or splitting channels. With reference to FIG. 5, a simple multiplexer/demultiplexer arrangement of add/drop filters is shown. In the case of a multiplexer, input fibers carrying one channel each are at one end 58 of the add/drop filter arrangement while an output fiber carrying 8 channels is at the other end 59 of the arrangement. For a demultiplexer, the designation of input and output fibers, of course, would be reversed. Therefore, for a given add/drop filter arrangement, there is one multifiber end and one single fiber end. The term "end" as used in the context of a multiplexer or demultiplexer refers conceptually to an input or an output of the add/drop arrangement and should not be construed as a structural or orientational limitation. For example, it is anticipated that certain add/drop filter arrangements may involve input fibers that couple with other channels downstream of other input fibers.

All the fibers in the ends of the add/drop filter arrangement are terminated with an optical connector to facilitate their connection to other fibers. Accordingly, each fiber of the multifiber end is terminated and the single fiber end is terminated. Suitable optical connectors are well known in the art. At the multifiber end, it is preferable to use multifiber connectors 14a (see FIG. 1) to accommodate all of the fibers in a relatively small area. A preferred multifiber ferrule connector is the Lightray MPX connector available through Tyco Electronics Corporation (Harrisburg, Pa.). At the single fiber end, it is preferable to use a single fiber connector 14b to allow the single fiber end to coupled individually as desired, unencumbered with other fibers. Suitable single fiber connectors are well known and include, for example, the LC Connector commercially available from Lucent Technologies and the MU Connector commercially available from NTT. The configuration of the connectors in the housing can vary according to the application, although it is preferable from a fiber management standpoint to group the multifiber connectors 14a at one end of the module and the single fiber connectors 14b at the other.

What is claimed is:

1. A tray for use in an add/drop module, said tray comprising:
   first and second submodules, each submodule having one or more compartments for containing individual add/drop filters;
   a first plurality of cascaded add/drop filters installed in said first submodule; and
   a second plurality of cascaded add/drops filters installed in said second submodule.

2. The tray of claim 1, wherein said submodules are substantially similar.

3. The tray of claim 2, wherein said submodules are hermaphroditic.

4. A tray for use in an add/drop module, said tray comprising:
   first and second submodules, each submodule having one or more compartments for containing individual add/drop filters, said first and second submodules being hermaphroditic, said compartments being asymmetrically located on said submodules such that when the submodules are combined, the compartments of opposite submodules are offset from one another and thus do not interfere with one another;
   a first plurality of cascaded add/drop filters installed in said first submodule: and
   a second plurality of cascaded add/drops filters installed in said second submodule.

5. The tray of claim 1, wherein each submodule has at least two compartments.

6. The tray of claim 5, wherein each compartment has at least two add/drop filters stacked therein.

7. The tray of claim 6, wherein each compartment has at least five add/drop filters stacked therein.

8. The tray of claim 1, wherein each submodule has bend guides to maintain a minimum bend radius for the fibers of said add/drop filters.

9. The tray of claim 8, wherein each bend guide manages at least two fibers.

10. The tray of claim 9, wherein fibers of add/drop filters contained in different compartments use the same bend guide.

11. The tray of claim 10, wherein said first plurality of add/drop filters is used for multiplexing and said second plurality of add/drops is used for demultiplexing.

12. An add/drop module comprising:
    a housing;
    a tray mounted in said housing, wherein said tray comprises at least:
       first and second submodules, each submodule having one or more compartments for containing individual add/drop filters;
       a first plurality of cascaded add/drop filters installed in said first submodule;
       a second plurality of cascaded add/drops filters installed in said second submodule; and
    connectors mounted to said housing and optically connected to the fibers at the ends of said first and second plurality of cascaded add/drop filters.

13. The tray of claim 4, wherein each submodule has at least two compartments.

14. The tray of claim 4, wherein each submodule has bend guides to maintain a minimum bend radius for the fibers of said add/drop filters.

15. The tray of claim 14, wherein fibers of add/drop filters contained in different compartments use the same bend guide.

16. The tray of claim 4, wherein said first plurality of add/drop filters is used for multiplexing and said second plurality of add/drops is used for demultiplexing.

17. An add/drop module comprising:
    a housing;
    a tray mounted in said housing, wherein said tray comprises at least:
       first and second submodules, each submodule having one or more compartments for containing individual add/drop filters, said first and second submodules being hermaphroditic, said compartments being asymmetrically located on said submodules such that when the submodules are combined, the compartments of opposite submodules are offset from one another and thus do not interfere with one another;
       a first plurality of cascaded add/drop filters installed in said first submodule;
       a second plurality of cascaded add/drops filters installed in said second submodule; and
    connectors mounted to said housing and optically connected to the fibers at the ends of said first and second plurality of cascaded add/drop filters.

18. The add/drop module of claim 17, wherein each submodule has bend guides to maintain a minimum bend radius for the fibers of said add/drop filters.

19. The add/drop module of claim 18, wherein fibers of add/drop filters contained in different compartments use the same bend guide.

20. The add/drop module of claim 17, wherein said first plurality of add/drop filters is used for multiplexing and said second plurality of add/drops is used for demultiplexing.

* * * * *